(12) United States Patent
Szeremeta

(10) Patent No.: US 7,701,705 B1
(45) Date of Patent: Apr. 20, 2010

(54) INFORMATION STORAGE DEVICE WITH SHEET METAL PROJECTIONS AND ELASTOMERIC INSERTS

(75) Inventor: Wally Szeremeta, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 42 days.

(21) Appl. No.: 11/953,782

(22) Filed: Dec. 10, 2007

(51) Int. Cl.
*H05K 5/00* (2006.01)
*G11B 17/03* (2006.01)

(52) U.S. Cl. .................. 361/679.36; 720/654; 248/633; 248/636; 248/638; 369/75.11

(58) Field of Classification Search ................ 361/679.01–679.45, 724–727; 360/97.01–99.12; 720/654–657
See application file for complete search history.

(56) References Cited

U.S. PATENT DOCUMENTS

| | | | |
|---|---|---|---|
| 4,713,714 A | | 12/1987 | Gatti et al. |
| 4,831,476 A | | 5/1989 | Branc et al. |
| 5,041,924 A | * | 8/1991 | Blackborow et al. .......... 360/69 |
| 5,062,016 A | | 10/1991 | Zupancic |
| 5,067,041 A | | 11/1991 | Cooke et al. |
| 5,124,855 A | | 6/1992 | Dew et al. |
| 5,216,582 A | * | 6/1993 | Russell et al. .......... 361/679.34 |
| 5,223,996 A | | 6/1993 | Read et al. |
| 5,243,495 A | | 9/1993 | Read et al. |
| 5,349,486 A | | 9/1994 | Sugimoto et al. |
| 5,463,527 A | | 10/1995 | Hager et al. |
| 5,511,055 A | | 4/1996 | Otsuki et al. |
| 5,586,893 A | | 12/1996 | Mosquera |
| 5,654,875 A | | 8/1997 | Lawson |
| 5,694,267 A | | 12/1997 | Morehouse et al. |
| 5,777,821 A | | 7/1998 | Pottebaum |
| 5,870,247 A | | 2/1999 | Schirle |
| 6,018,125 A | | 1/2000 | Collins et al. |
| 6,147,834 A | | 11/2000 | Srikrishna et al. |
| 6,185,097 B1 | | 2/2001 | Behl |
| 6,252,770 B1 | | 6/2001 | Yu et al. |
| 6,275,352 B1 | | 8/2001 | Tadepalli et al. |
| 6,285,545 B1 | | 9/2001 | Lopez |
| 6,292,373 B1 | | 9/2001 | Li et al. |
| 6,319,026 B1 | | 11/2001 | Chen et al. |

(Continued)

OTHER PUBLICATIONS

3M Mini Serial Attached SCSI (miniSAS) Connector, 8A26/8C26 Series, Sep. 2007, TS-2211-B, 9 pages.

(Continued)

*Primary Examiner*—Jayprakash N Gandhi
*Assistant Examiner*—Nidhi Desai

(57) ABSTRACT

A novel information storage device is disclosed and claimed. The information storage device includes a disk drive and a sheet metal support attached to the disk drive. The sheet metal support includes a plurality of sheet metal projections, each including a major surface. Each of at least two of the plurality of sheet metal projections includes at least one tab bent out of a plane that includes the major surface of that sheet metal projection. The information storage device also includes a plurality of elastomeric inserts. Each of the plurality of elastomeric inserts includes a cavity sized to receive one of the plurality of sheet metal projections. The information storage device also includes a housing. The housing includes a plurality of receptacles, each sized to receive one of the plurality of elastomeric inserts.

19 Claims, 9 Drawing Sheets

U.S. PATENT DOCUMENTS

| | | | |
|---|---|---|---|
| 6,354,875 B1 | 3/2002 | Wu | |
| 6,407,913 B1 | 6/2002 | Peachey et al. | |
| 6,411,522 B1 | 6/2002 | Frank, Jr. et al. | |
| 6,437,980 B1 | 8/2002 | Casebolt | |
| 6,462,958 B2 | 10/2002 | Ogata | |
| 6,480,380 B1 | 11/2002 | French et al. | |
| 6,487,039 B1 | 11/2002 | Bernett | |
| 6,498,722 B1 * | 12/2002 | Stolz et al. | 361/679.36 |
| 6,535,384 B2 | 3/2003 | Huang | |
| 6,538,886 B2 | 3/2003 | Yu | |
| 6,561,836 B1 | 5/2003 | Marshall et al. | |
| 6,567,265 B1 | 5/2003 | Yamamura et al. | |
| 6,567,360 B1 | 5/2003 | Kagawa | |
| 6,593,673 B1 | 7/2003 | Sugai et al. | |
| 6,618,246 B2 | 9/2003 | Sullivan et al. | |
| 6,621,717 B2 | 9/2003 | Tuttle et al. | |
| 6,661,651 B1 | 12/2003 | Tanzer et al. | |
| 6,661,677 B1 | 12/2003 | Rumney | |
| 6,735,080 B1 | 5/2004 | Chang | |
| 6,751,092 B1 | 6/2004 | Ohnishi et al. | |
| 6,752,654 B1 | 6/2004 | Huang et al. | |
| 6,758,685 B1 | 7/2004 | Huang et al. | |
| 6,761,580 B2 | 7/2004 | Chang | |
| 6,781,826 B1 | 8/2004 | Goldstone et al. | |
| 6,790,066 B1 | 9/2004 | Klein | |
| 6,811,427 B2 | 11/2004 | Garrett et al. | |
| 6,843,674 B1 | 1/2005 | Young | |
| D512,422 S | 12/2005 | Sato et al. | |
| 7,035,097 B2 | 4/2006 | Petrov et al. | |
| D521,935 S | 5/2006 | Lai | |
| D521,936 S | 5/2006 | Novotney et al. | |
| D538,233 S | 3/2007 | Wan et al. | |
| 7,187,543 B2 | 3/2007 | Zimlin | |
| 7,211,739 B1 | 5/2007 | Brigham, Jr. et al. | |
| 7,307,843 B2 | 12/2007 | Harman et al. | |
| 2003/0206402 A1 | 11/2003 | Tsuyuki et al. | |
| 2005/0030712 A1 | 2/2005 | Faneuf et al. | |
| 2005/0063155 A1 | 3/2005 | Endo et al. | |
| 2005/0088778 A1 * | 4/2005 | Chen et al. | 360/97.02 |
| 2005/0185326 A1 | 8/2005 | Bruner et al. | |
| 2005/0205279 A1 | 9/2005 | Cochrane | |
| 2005/0215084 A1 | 9/2005 | Ho et al. | |
| 2006/0158775 A1 | 7/2006 | Sega et al. | |
| 2007/0091567 A1 | 4/2007 | Hayashi | |
| 2007/0149029 A1 | 6/2007 | Hwang | |

OTHER PUBLICATIONS

3M Mini Serial Attached SCSI (miniSAS) Connector/Shell, 8A36/8B36 Series, Feb. 2007, TS-2219-01, 7 pages.

Peter A. Masterson, "Isolation Techniques for 2.5-Inch Hard Disk Drives", www.earshockandvibe.com/pdfs/engineering/2.5HDD.pdf, downloaded on Dec. 10, 2007, 4 pages.

\* cited by examiner

INFORMATION STORAGE DEVICE WITH SHEET METAL PROJECTIONS AND ELASTOMERIC INSERTS

BACKGROUND OF THE INVENTION

1. Field of the Invention

The present invention relates generally to the field of information storage devices, and more particularly to mounting systems and housings for information storage devices.

2. Background of the Art

Information storage devices are used to retrieve and/or store data for computer systems and other consumer electronics products. A magnetic hard disk drive is an example of an information storage device. Many information storage devices, including magnetic hard disk drives, are sensitive to their external environment, including mechanical shocks, externally applied forces and electromagnetic fields, contamination, changes in temperature and/or humidity, etc. Therefore, an information storage device's housing and mounting system may affect its performance, reliability, and lifetime.

Many information storage devices are housed within the system for which they retrieve and/or store data. For example, so-called "internal" disk drives are housed within a host computer system for which they store data, and therefore internal disk drives may take advantage of the host computer system for electrical power, electromagnetic shielding, convective and/or conductive cooling, vibration dampening, some degree of isolation from external mechanical shocks, etc.

Other information storage devices are not housed within the system for which they retrieve and/or store data. For example, a so-called "external" hard disk drive includes its own housing which may provide electromagnetic shielding, vibration dampening, some degree of isolation from external mechanical shocks, and active or passive cooling.

The mounting systems and housings for modern information storage devices must often meet challenging space and cost requirements. Accordingly, there is an ongoing need in the art for improved mounting systems and housings for information storage devices.

SUMMARY

A novel information storage device is disclosed and claimed. The information storage device includes a disk drive and a sheet metal support attached to the disk drive. The sheet metal support includes a plurality of sheet metal projections, each including a major surface. Each of at least two of the plurality of sheet metal projections includes at least one tab bent out of a plane that includes the major surface of that sheet metal projection. The information storage device also includes a plurality of elastomeric inserts. Each of the plurality of elastomeric inserts includes a cavity sized to receive one of the plurality of sheet metal projections. The information storage device also includes a housing. The housing includes a plurality of receptacles, each sized to receive one of the plurality of elastomeric inserts.

DETAILED DESCRIPTION OF EXEMPLARY EMBODIMENTS

Figure 1:
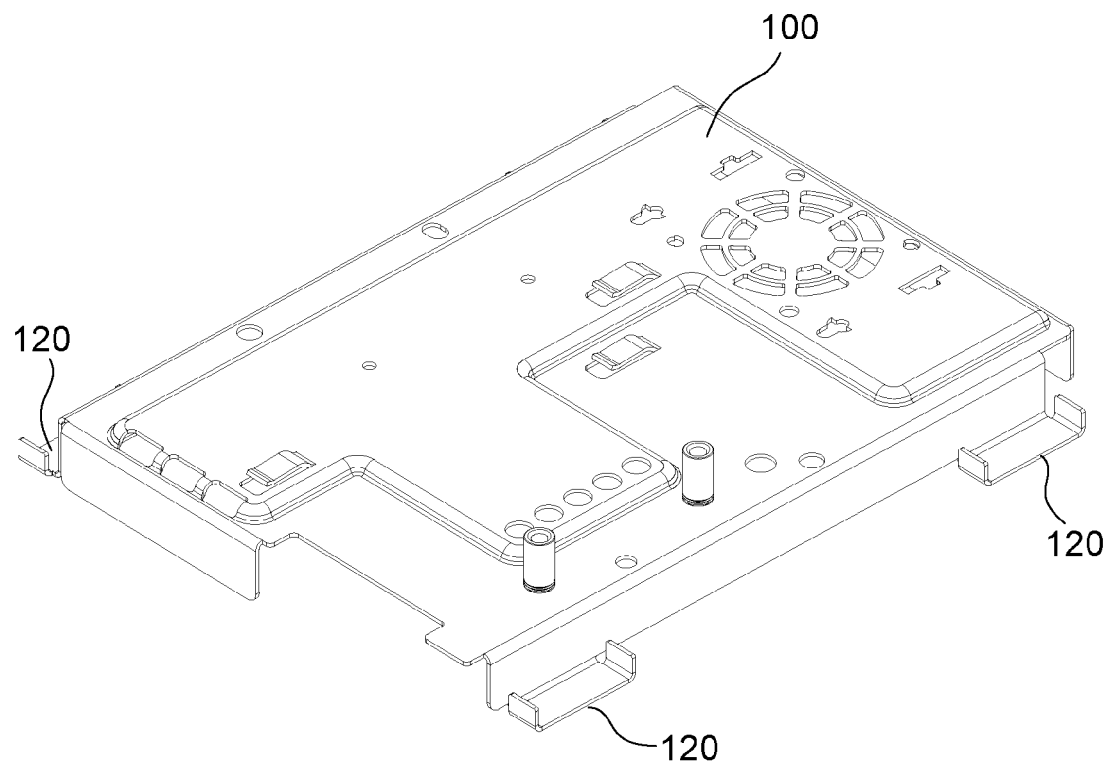
FIG. 1 depicts an example of a sheet metal support according to an embodiment of the present invention.

A novel information storage device is disclosed and claimed. FIG. 1 depicts an example of a sheet metal support 100 according to an embodiment of the present invention. The sheet metal support 100 includes a plurality of sheet metal projections 120.

Figure 2:
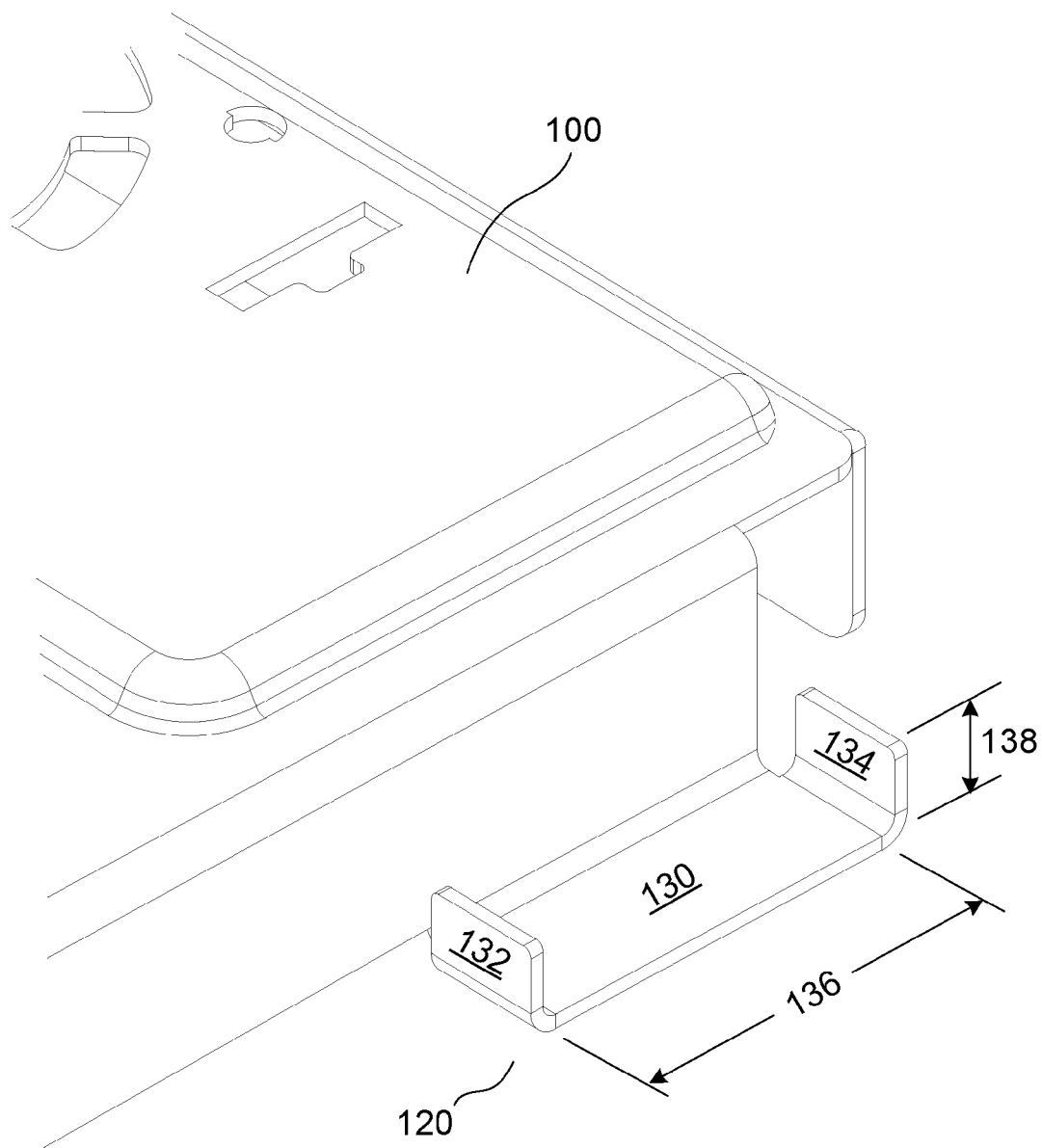
FIG. 2 depicts a corner region of the sheet metal support of FIG. 1.

Now referring additionally to FIG. 2, which depicts a corner region of the sheet metal support 100 of FIG. 1, each of the plurality of sheet metal projections 120 includes a major surface 130. Each of at least two of the plurality of sheet metal projections 120 includes at least one tab 132 bent out of a plane that includes the major surface 130 of that sheet metal projection 120. Preferably the plurality of sheet metal projections 120 includes four sheet metal projections 120, and all four sheet metal projections 120 include at least one tab 132 bent out of a plane that includes the major surface 130 of that sheet metal projection. More preferably, each of at least two of the sheet metal projections 120 includes two tabs 132, 134 bent out of the plane that includes the major surface 130 of that sheet metal projection 120. Preferably but not necessarily, each of the sheet metal projections having two tabs is C-shaped (e.g. like the sheet metal projection 120 shown in FIG. 2).

In the embodiment of FIG. 2, preferably each of the two tabs 132, 134 extends out of the plane that includes the major surface 130 for a distance 138 that is at least 30% but no more than 80% of a longest dimension 136 of the major surface 130.

Figure 3:
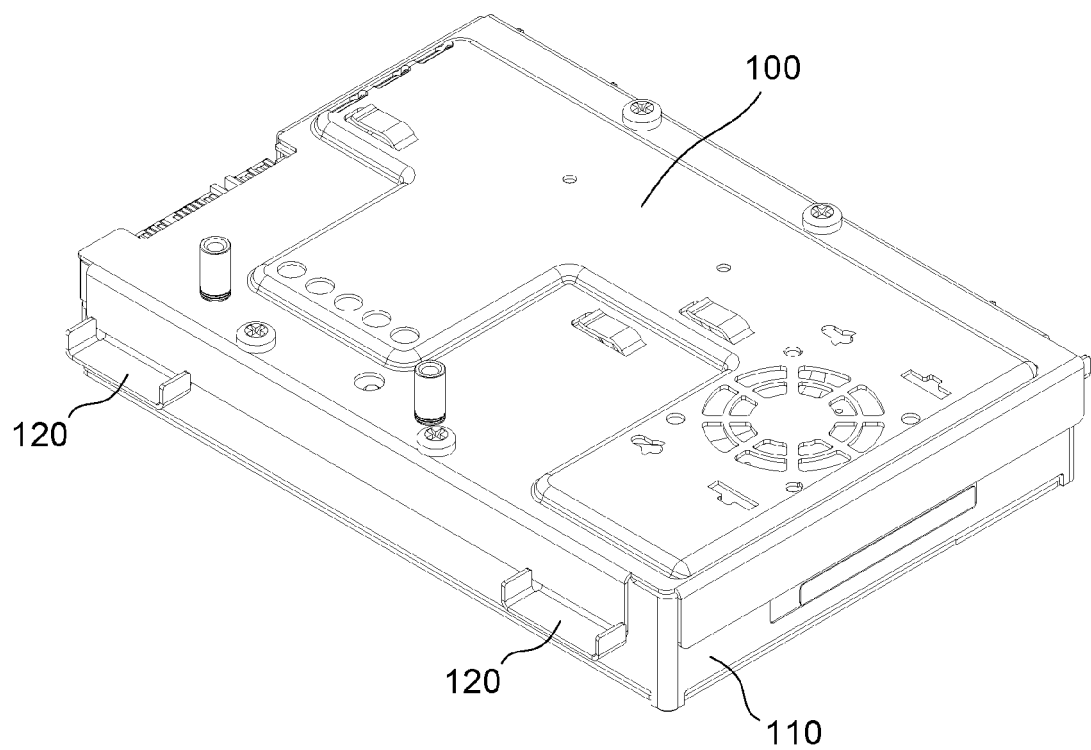
FIG. 3 depicts an example of a sheet metal support according to an embodiment of the present invention, attached to a disk drive.

FIG. 3 depicts the sheet metal support 100 attached to a disk drive 110. Disk drive 110 may be of various form factors. For example, disk drive 110 may be a 3.5" form-factor disk drive. Also for example, disk drive 110 may be a 2.5" form factor disk drive. The size of the disk drive 110 may affect the design of the sheet metal support 100 because the compliance of the elastomeric supports may be scaled according to the disk drive mass for acceptable mechanical shock performance, and such compliance depends upon design parameters such as the area of contact between the sheet metal projections and the elastomeric inserts. For example, if the disk drive 110 is a 3.5" form-factor magnetic hard disk drive, then each of the two tabs 132, 134 preferably extends out of the plane that includes the major surface 130 for a distance 138 that is at least 4 mm. Also for example, if the disk drive 110 is a 2.5" form-factor magnetic hard disk drive, then each of the two tabs 132, 134 preferably extends out of the plane that includes the major surface 130 for a distance 138 that is at least 2 mm.

Figure 4:
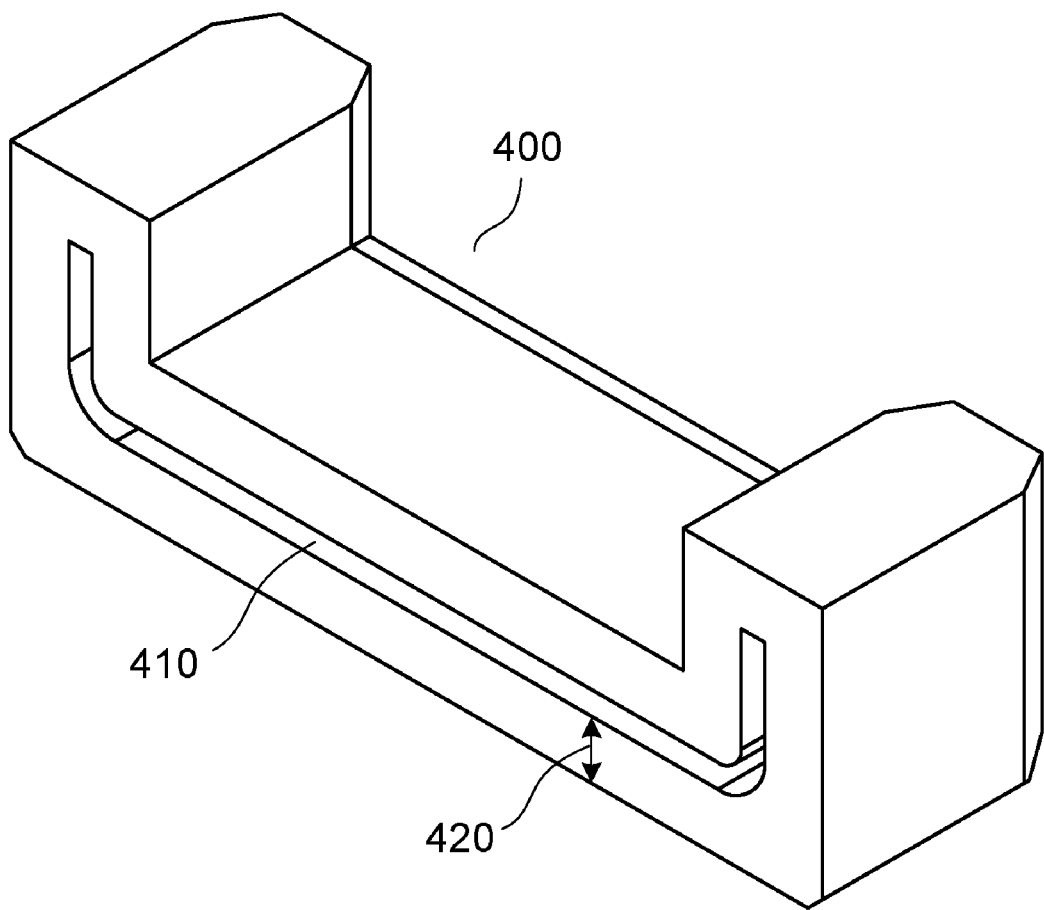
FIG. 4 depicts an example of an elastomeric insert according to an embodiment of the present invention.
Figure 5:
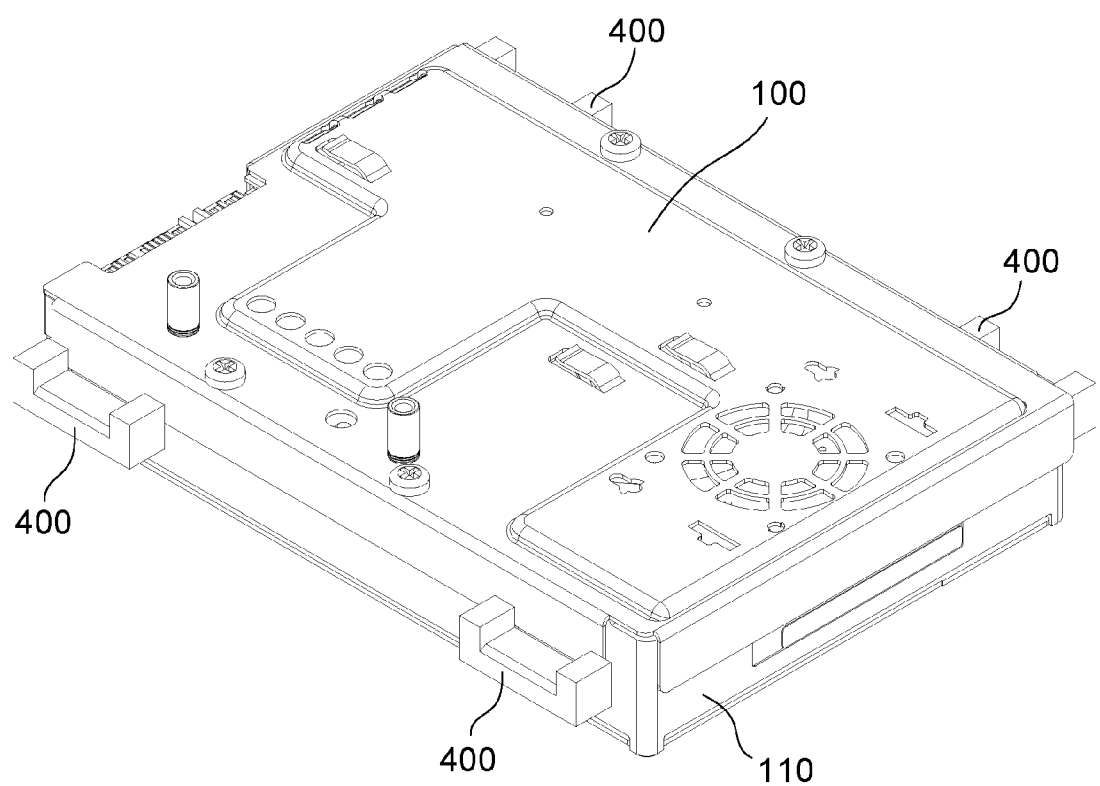
FIG. 5 depicts an example of a sheet metal support with elastomeric inserts, according to an embodiment of the present invention, and attached to a disk drive.

The thickness of the sheet metal from which sheet metal support 100 is fabricated may also be scaled according to disk drive form factor. For example, if the disk drive 110 is a 3.5" form-factor magnetic hard disk drive, then each of the plurality of sheet metal projections 120 preferably defines a sheet metal thickness in the range 0.8 mm to 1.6 mm. Also for example, if the disk drive 110 is a 2.5" form-factor magnetic hard disk drive, then each of the plurality of sheet metal projections 120 preferably defines a sheet metal thickness in the range 0.4 mm to 1.2 mm. Now referring additionally to FIG. 4, the novel information storage device includes a plurality of elastomeric inserts 400, each including a cavity 410 sized to receive one of the plurality of sheet metal projections 120. FIG. 5 depicts sheet metal support 100, with each of its sheet metal projections 120 inserted into a cavity 410 of one of a plurality of elastomeric inserts 400, attached to a disk drive 110. The plurality of elastomeric inserts preferably comprises a viscoelastic material such as rubber, silicon rubber, EPDM rubber (ethylene propylene terpolymer), or butyl rubber (isombutylene-isoprene copolymer). Each of the plurality of elastomeric inserts 400 defines an elastomeric material thickness 420 measured from an inside surface of the cavity 410 to an outside surface of the elastomeric insert 400 and measured in a direction normal to the inside surface of the cavity 410. In the embodiment of FIG. 4, if the disk drive 110 is a 3.5" form factor disk drive, then the elastomeric thickness 420 is preferably in the range 1 mm to 6.5 mm, whereas if the disk drive 110 is a 2.5" form factor disk drive, then the elastomeric thickness 420 is preferably in the range 0.8 mm to 4.5 mm.

Figure 6:
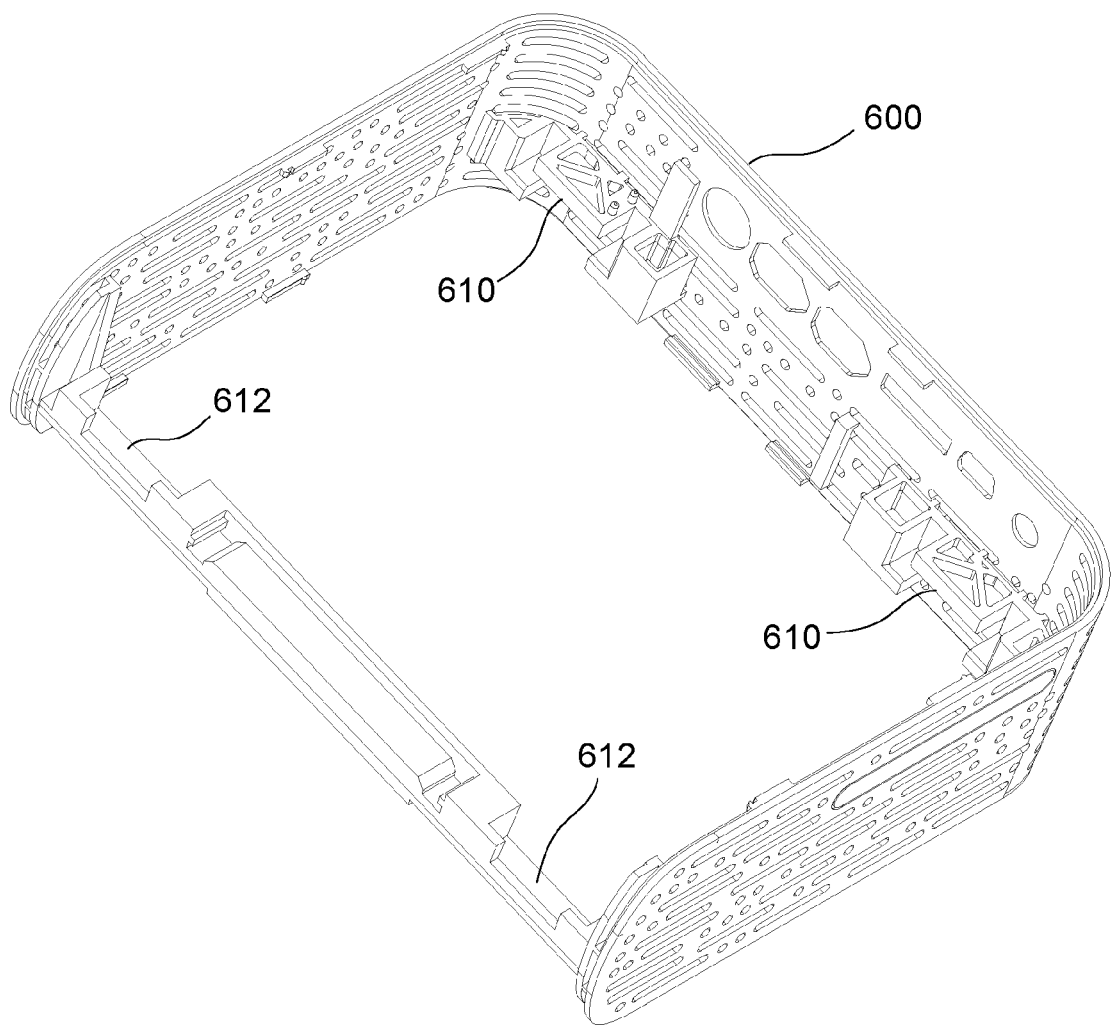
FIG. 6 depicts an example of a housing according to an embodiment of the present invention.

FIG. 6 depicts an example of a housing 600 according to an embodiment of the present invention. Housing 600 includes a plurality of receptacles 610 and 612. Each of the plurality of receptacles 610 and 612 is sized to receive one of the plurality of elastomeric inserts 400. The plurality of receptacles 610 and 612 includes a plurality of closed receptacles 610 and a plurality of open receptacles 612. Each of the two closed receptacles 610 is sized to constrain translation of an elastomeric insert 400 in all directions except for the direction of insertion, whereas each of the two open receptacles 612 allows one additional direction of translation to facilitate assembly. Since relative motion of the inserts is constrained by the plurality of receptacles 610 and 612, preferably no metal fastener need pass through any of the plurality of elastomeric inserts 400.

Figure 7A:
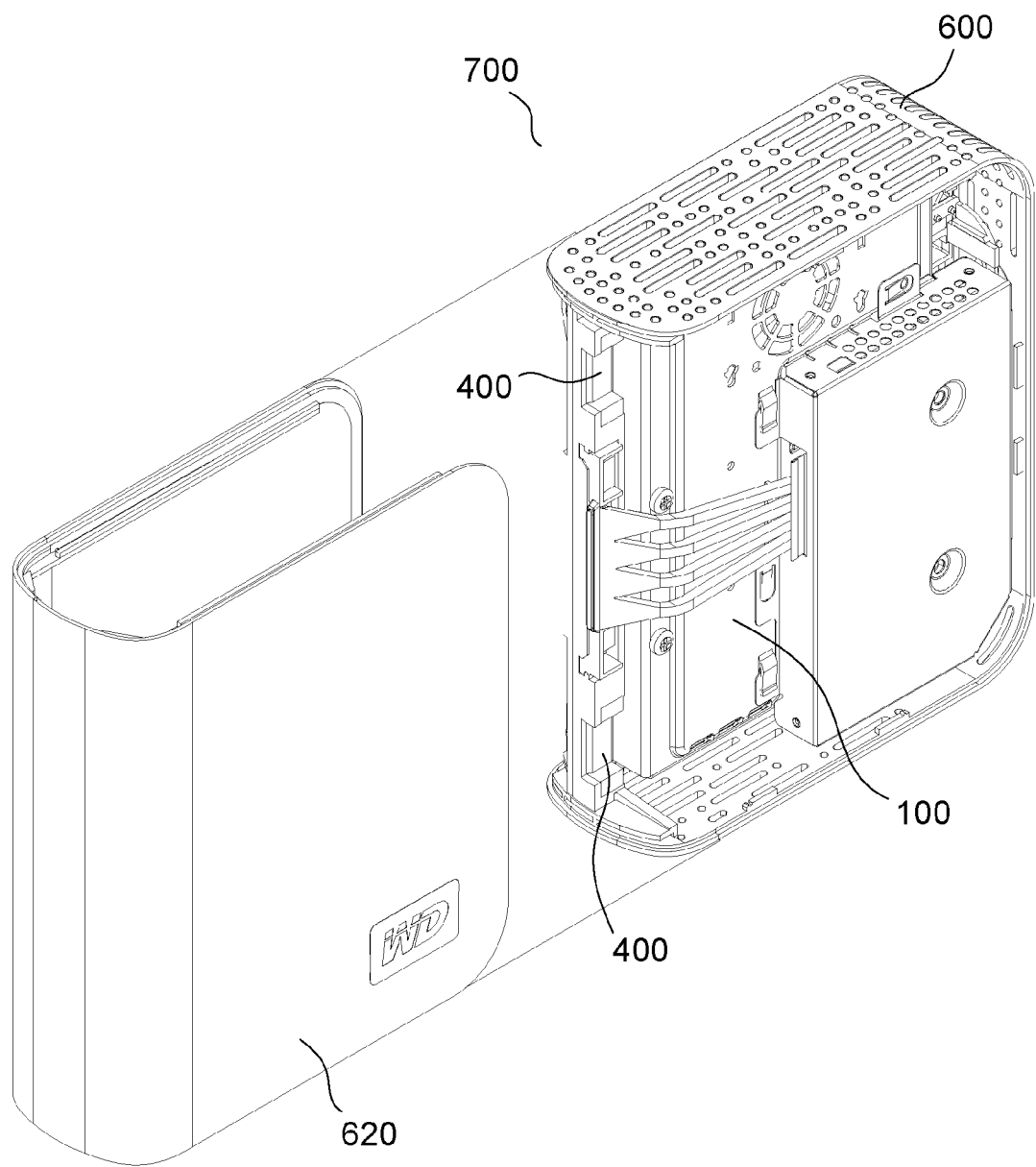
FIG. 7A depicts a partially exploded view of an example of an information storage device according to an embodiment of the present invention.

FIG. 7A is a partially exploded view of an example of an information storage device 700, according to an embodiment of the present invention. The information storage device 700 includes a housing 600 and a cover 620. In the exploded view of FIG. 7A, two of the four elastomeric inserts 400 are exposed and therefore visible.

Figure 7B:
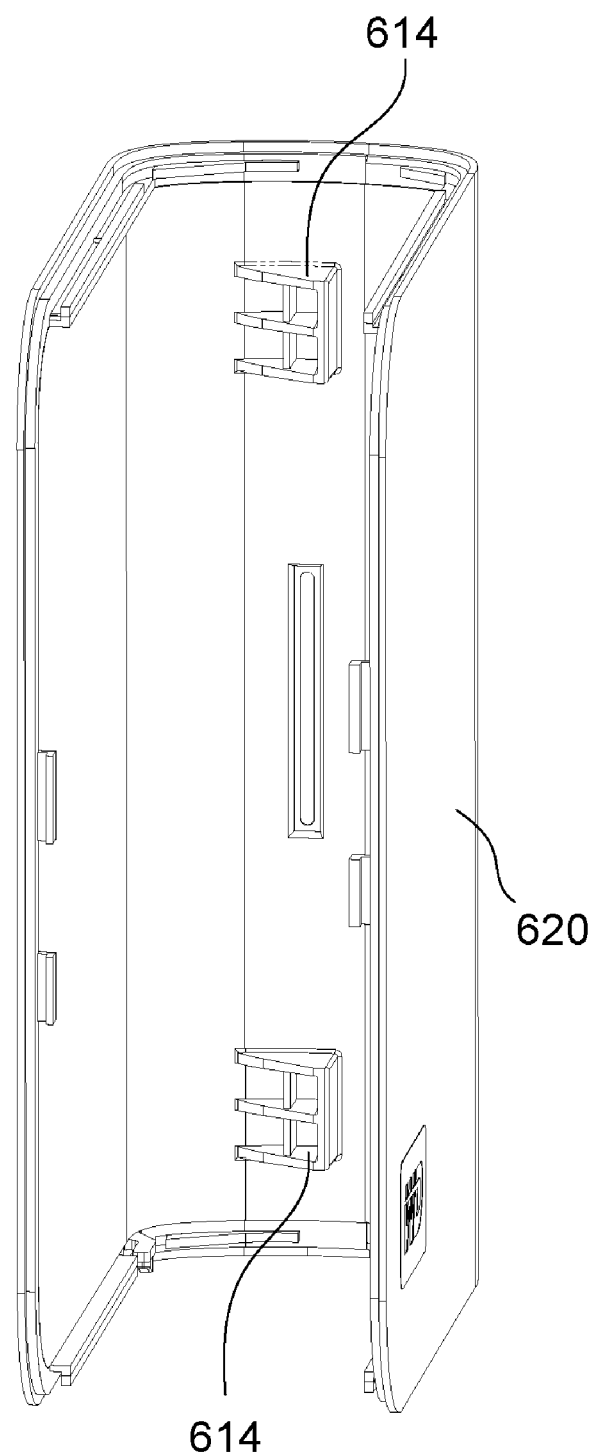
FIG. 7B depicts a perspective view of the cover component of the information storage device of FIG. 7A.

Now referring additionally to FIG. 7B, the cover 620 may include one or more surfaces adjacent to the open receptacles 612 to constrain translation of the elastomeric inserts 400 out of the receptacles 612. For example, in the embodiment of FIG. 7B, the cover 620 includes two protrusions 614 that mate with open receptacles 612 to further constrain translation of the visible elastomeric inserts 400 relative to the open receptacles 612 in which they sit. For example, the two elastomeric inserts 400 that are visible in FIG. 7A may each be constrained by a surface of one of the protrusions 614 of cover 620, when the cover 620 is reassembled with housing 600. Specifically, in the exploded view of FIG. 7A the two exposed elastomeric inserts 400 may translate out of open receptacles 612 of the housing 600, whereas after reassembly of cover 620 with housing 600, translation of all elastomeric inserts 400 will be constrained by receptacles 610 and 612, and protrusions 614, without the need for fasteners.

Figure 8:
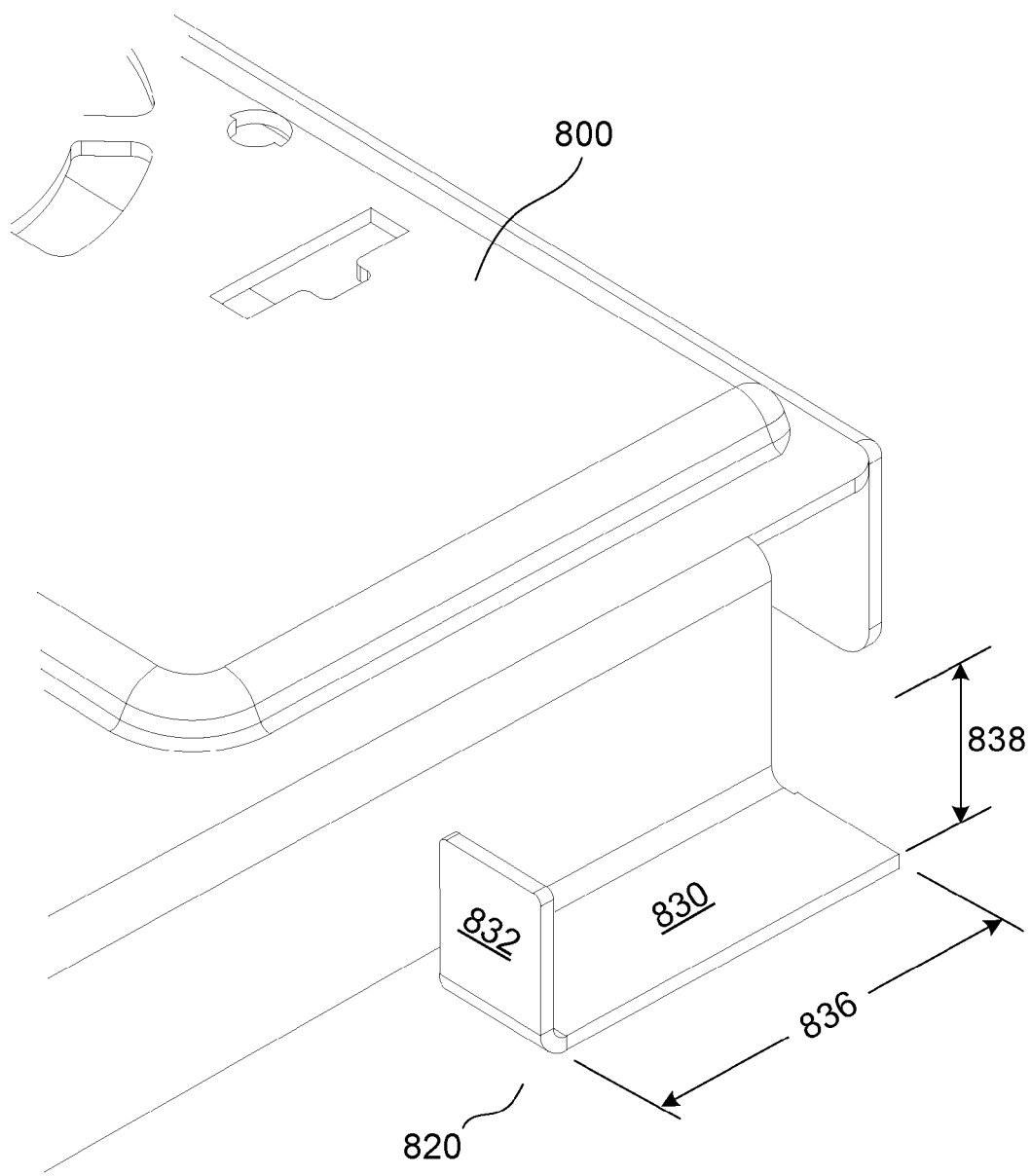
FIG. 8 depicts a corner region of an example of a sheet metal support according to an embodiment of the present invention.

FIG. 8 depicts a corner region of an example of a sheet metal support 800 according to an embodiment of the present invention. In the embodiment of FIG. 8, the sheet metal projection 820 includes one tab 832 bent out of the plane that includes the major surface 830 of that sheet metal projection. Preferably but not necessarily sheet metal projections having one out-of-plane tab have an L-shaped cross-section. In the embodiment of FIG. 8, the tab 832 preferably extends out of the plane that includes the major surface 830 for a distance 838 that is at least 60% but no more than 1.6 times the longest dimension 836 of the major surface.

In the embodiment of FIG. 8, if the disk drive (to which sheet metal support 800 is attached) is a 3.5" form-factor magnetic hard disk drive, then the tab 832 preferably extends out of the plane that includes the major surface 830 for at least 4 mm. However if the supported disk drive is a 2.5" form-factor magnetic hard disk drive, then the tab 832 preferably extends out of the plane that includes the major surface 830 for at least 2 mm.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. An information storage device comprising:
    a disk drive;
    a sheet metal support attached to the disk drive, the sheet metal support including a plurality of sheet metal projections, each of the plurality of sheet metal projections including a major surface that projects out from the sheet metal support, each of at least two of the plurality of sheet metal projections including at least one tab bent out of a plane that includes the major surface of that sheet metal projection;
    a plurality of elastomeric inserts, each of the plurality of elastomeric inserts including a cavity sized to receive the major surface of one of the plurality of sheet metal projections; and
    a housing including a plurality of receptacles, each of the plurality of receptacles sized to receive one of the plurality of elastomeric inserts; wherein each of the plurality of receptacles includes at least two internal receptacle surfaces that are parallel and opposite each other and that face each other.

2. The information storage device of claim 1 wherein the plurality of sheet metal projections comprises four sheet metal projections.

3. The information storage device of claim 2 wherein each of the four sheet metal projections includes at least one tab bent out of the plane that includes the major surface of that sheet metal projection.

4. The information storage device of claim 1 wherein each of the at least two of the plurality of sheet metal projections includes two tabs bent out of the plane that includes the major surface of that sheet metal projection.

5. The information storage device of claim 4 wherein each of the at least two of the plurality of sheet metal projections has a C-shaped cross-section.

6. The information storage device of claim 5 wherein each of the two tabs extends out of the plane that includes the major surface for a distance that is at least 30% but no more than 80% of a longest dimension of the major surface.

7. The information storage device of claim 5 wherein the disk drive is a 3.5" form-factor magnetic hard disk drive, and wherein each of the two tabs extends out of the plane that includes the major surface for at least 4 mm.

8. The information storage device of claim 5 wherein the disk drive is a 2.5" form-factor magnetic hard disk drive, and wherein each of the two tabs extends out of the plane that includes the major surface for at least 2 mm.

9. The information storage device of claim 1 wherein each of the at least two of the plurality of sheet metal projections includes one tab bent out of the plane that includes the major surface of that sheet metal projection.

10. The information storage device of claim 9 wherein each of the at least two of the plurality of sheet metal projections has an L-shaped cross-section.

11. The information storage device of claim 10 wherein the tab extends out of the plane that includes the major surface for a distance that is at least 60% but no more than 1.6 times the longest dimension of the major surface.

12. The information storage device of claim 10 wherein the disk drive is a 3.5" form-factor magnetic hard disk drive, and wherein the tab extends out of the plane that includes the major surface for at least 4 mm.

13. The information storage device of claim 10 wherein the disk drive is a 2.5" form-factor magnetic hard disk drive, and wherein the tab extends out of the plane that includes the major surface for at least 2 mm.

14. The information storage device of claim 1 wherein the disk drive is a 3.5" form-factor magnetic hard disk drive, and wherein each of the plurality of elastomeric inserts defines an elastomeric material thickness measured from an inside surface of the cavity to an outside surface of the elastomeric insert and measured in a direction normal to the inside surface of the cavity, and wherein the elastomeric thickness is in the range 1 mm to 6.5 mm.

15. The information storage device of claim 1 wherein the disk drive is a 2.5" form-factor magnetic hard disk drive, and wherein each of the plurality of elastomeric inserts defines an elastomeric material thickness measured from an inside surface of the cavity to an outside surface of the elastomeric insert and measured in a direction normal to the inside surface of the cavity, and wherein the elastomeric thickness is in the range 0.8 mm to 4.5 mm.

16. The information storage device of claim 1 wherein the disk drive is a 3.5" form-factor magnetic hard disk drive, and wherein each of the plurality of sheet metal projections defines a sheet metal thickness in the range 0.8 mm to 1.6 mm.

17. The information storage device of claim 1 wherein the disk drive is a 2.5" form-factor magnetic hard disk drive, and wherein each of the plurality of sheet metal projections defines a sheet metal thickness in the range 0.4 mm to 1.2 mm.

18. The information storage device of claim 1 wherein the plurality of elastomeric inserts comprises a viscoelastic material.

19. The information storage device of claim 1 wherein no metal fastener passes through any of the plurality of elastomeric inserts.

* * * * *